US006993769B2

(12) United States Patent
Simonson et al.

(10) Patent No.: US 6,993,769 B2
(45) Date of Patent: Jan. 31, 2006

(54) SYSTEM AND METHOD FOR REPLACING UNDERLYING CONNECTION-BASED COMMUNICATION MECHANISMS IN REAL TIME SYSTEMS AT RUN-TIME

(75) Inventors: Peter Simonson, Greenville, NH (US); Robert W. Costantino, Milford, NH (US); Paul S. VanBellinghen, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/230,777

(22) Filed: Aug. 29, 2002

(65) Prior Publication Data

US 2004/0045006 A1 Mar. 4, 2004

(51) Int. Cl.
*G06F 15/163* (2006.01)
(52) U.S. Cl. .................. 719/311; 718/106; 709/231
(58) Field of Classification Search .............. 718/106; 719/311; 709/231
See application file for complete search history.

(56) References Cited

U.S. PATENT DOCUMENTS 6,108,717 A * 8/2000 Kimura et al. ............... 710/8
6,282,568 B1 * 8/2001 Sondur et al. ............. 709/223
6,363,421 B2 * 3/2002 Barker et al. ............. 709/223

* cited by examiner

*Primary Examiner*—Meng-Al T. An
*Assistant Examiner*—Andy Ho
(74) *Attorney, Agent, or Firm*—Malin, Haley & DiMaggio, P.A.

(57) ABSTRACT

A distributed processor architecture computer system and method that includes one or more processors and object oriented control program for real time and near-real time streaming data processing which is able to change the underlying communication mechanism at runtime, which includes the use of a software interface that hides the underlying communication mechanism. The present invention permits the accommodation of changes in communication resource availability due to link, equipment, or software failures or communication bandwidth resources being used by other collaborating programs. The ability to select a communication mechanism based upon cost performance for the particular program deployment and communication mechanism availability as described in the present invention. Typical criteria used for selecting different communication mechanisms for streaming a high volume data on each individual connection would include lower latency, lower overhead time per message, higher throughput in bytes per second of a particular computer, communication equipment and operating system independence.

8 Claims, 3 Drawing Sheets

SYSTEM AND METHOD FOR REPLACING UNDERLYING CONNECTION-BASED COMMUNICATION MECHANISMS IN REAL TIME SYSTEMS AT RUN-TIME

BACKGROUND OF THE INVENTION

1. Field of the Invention

This invention relates to a system and method for distributed processing real-time systems of general purpose or special purpose computers for replacing the underlying connection-based communication systems at run-time, including communication between multiple computer programs executing on multiple computers.

2. Description of Related Art

Distributed processing systems of general or special purpose computers perform their problem solving tasks by partitioning the computations to be performed into software programs that perform discrete defined processing. Typically, these software programs execute on one or more processors. Multiple programs may reside on one processor, depending on the computation resources available and the size of the task to be performed.

The configuration and deployment of programs to processors in such a distributed processing architecture is required to be determined at run-time, not in advance, to accommodate changes in processing resource availability due to equipment failures, software failures, and resources being used by other programs.

These programs communicate inputs, outputs, and intermediate processing results as part of the collaboration required to perform the task at hand.

This communication occurs between processors on some "communication fabric." Communication fabric refers to some set of dedicated, switched, or demand access based set of electrical, physical, and logical interfaces providing the actual transfer of coded information between processors, including single point-to-point topologies, as well as larger topologies.

Communication between processors is performed using software interfaces that hide the details of implementation of the communication mechanisms. For streaming data, such as signals measured from transducers or other sensors, or for large amounts of data to be processed and communicated in real-time, a connection-based communication protocol, or a stateless communication protocol emulating a connection-based protocol, is used.

Heretofore, the underlying communication mechanism for streaming data or large volume real-time data was 1) the same as the communication mechanism used for the configuration and deployment of the programs; 2) determined in advance, at design-, code-, compile-, or link-time, possibly selected from a set of available mechanisms, based on some desired performance characteristic.

The lack of a mechanism to select the communication mechanism at run-time, not in advance, independent of the communication mechanism used for the configuration and deployment of the programs, prohibits the accommodation of changes in communication resource availability due to link, equipment or software failures, or communication bandwidth resources being used by other collaborating programs.

Furthermore, the lack of a mechanism to select the communication mechanism at run-time, independent of the communication mechanism used for the configuration and deployment of the programs, denies the system designer and integrator the ability to select the communication mechanism based on cost-performance for the particular program development, streaming/high-volume interface requirement, and communication mechanism availability.

Based on the above considerations, it is desirable to replace existing processor communication mechanisms in the operation of a distributed processing architecture framework for real-time and near real-time streaming data processing. The present invention provides the ability to change the underlying mechanism at run-time, solving the problem of how to handle changes in the processing and communication equipment when employing a distributed processing system.

SUMMARY OF THE INVENTION

The subject invention is the system and method of selecting the underlying data communications mechanism at run-time. The selection of the underlying communications mechanism is performed at the time the communications connections are established between programs. This establishment of communications connection, and selection of underlying communications mechanism may be well in advance of the transfer of information or immediately preceding said transfer. The design of the software interface hides the underlying communication mechanism. This software interface on the application sides of the interface which provides the mechanisms needed to have the communication mechanism select at connection time, independent of the communication mechanism used for configuration and deployment, is independent of the mechanism selected. The application program itself has no specialized accommodation for any specific selected communications mechanisms, such accommodations exist in the software interface.

Typical criteria for selecting different communication mechanisms for streaming or high-volume data on each individual connection include lower latency; lower overhead time per message; and higher throughput (bytes/second).

The present invention is embodied and described in object-oriented software. The term program shall mean a collection of objects collaborating as a single subsystem, to produce some meaningful result as a computation, data, and algorithm element in a distributed processing system. The class or object names used herein are used only for descriptive purposes and are not particular or peculiar to the invention itself.

The system provides that each program in the distributed architecture system (DAS) that emits streaming data or large quantities of data in real-time or near real-time has at least one object of class outPort. This outPort object provides the software interface from each application program to the underlying communication mechanism.

To send data from an application program, the application program invokes the send( ) method of the outPort with an argument of a pointer (address) to the data packet to be sent. The application program does not have direct access to the list of destinations, nor access to whether there is in fact any destination, nor access to the communication mechanisms used. The interface of the outPort object to the application program hides the details of implementation of the communication mechanisms. When the send( ) method returns, the application may behave as if data were sent. The underlying communication mechanism may optionally defer the physical communication until resources are available.

At least one object of class inPort is provided to each program in the distributed architecture system that accepts streaming data or large quantities of data in near real-time.

This inPort object provides the interface from the underlying communication mechanisms to the application program.

To receive data into an application program, the extended base class inPort of the application program performs meaningful processing in the method acceptPacket( ) with an argument of a pointer (address) to the data packet to be received. This is done by having the inPort method acceptPacket( ) invoke the application acceptPacket( ) method.

The application program does not have direct access to the source of the data, nor access to whether there is in fact any source, except when the acceptPacket( ) is invoked, nor access to the communication mechanisms used. When the application program acceptPacket( ) method returns, the inPort object can behave as if the data were received. The application may optionally defer the actual processing; however, a copy of the data must be made. By employing the process of send( ) and acceptPacket( ), application programs send and receive the streaming data.

It is an object of this invention to provide a distributed processing architecture framework for real-time and near real-time streaming data processing between processors that has the ability to change the underlying communication mechanism at run-time. Further the desired appropriate communication mechanism for the task to be performed can be selected based on cost/performance requirements.

It is another object of this invention to provide a communication system and method for a distributed processing system for general or special purpose computers for replacing underlying connection-based communication mechanisms in real-time systems at run-time such that the mechanism can be selected from a set of available communication mechanisms based on some desired performance characteristics.

Another object of this invention is to allow system designers the ability to select the communication system and method based on cost-performance for a particular streaming/high-volume interface requirement and system availability at run-time.

These and other objects advantages, and features will become clear as the description proceeds.

In accordance with these and other objects which will become apparent hereinafter, the instant invention will now be described with particular reference to the accompanying drawings.

PREFERRED EMBODIMENT OF THE INVENTION

Figure 1:
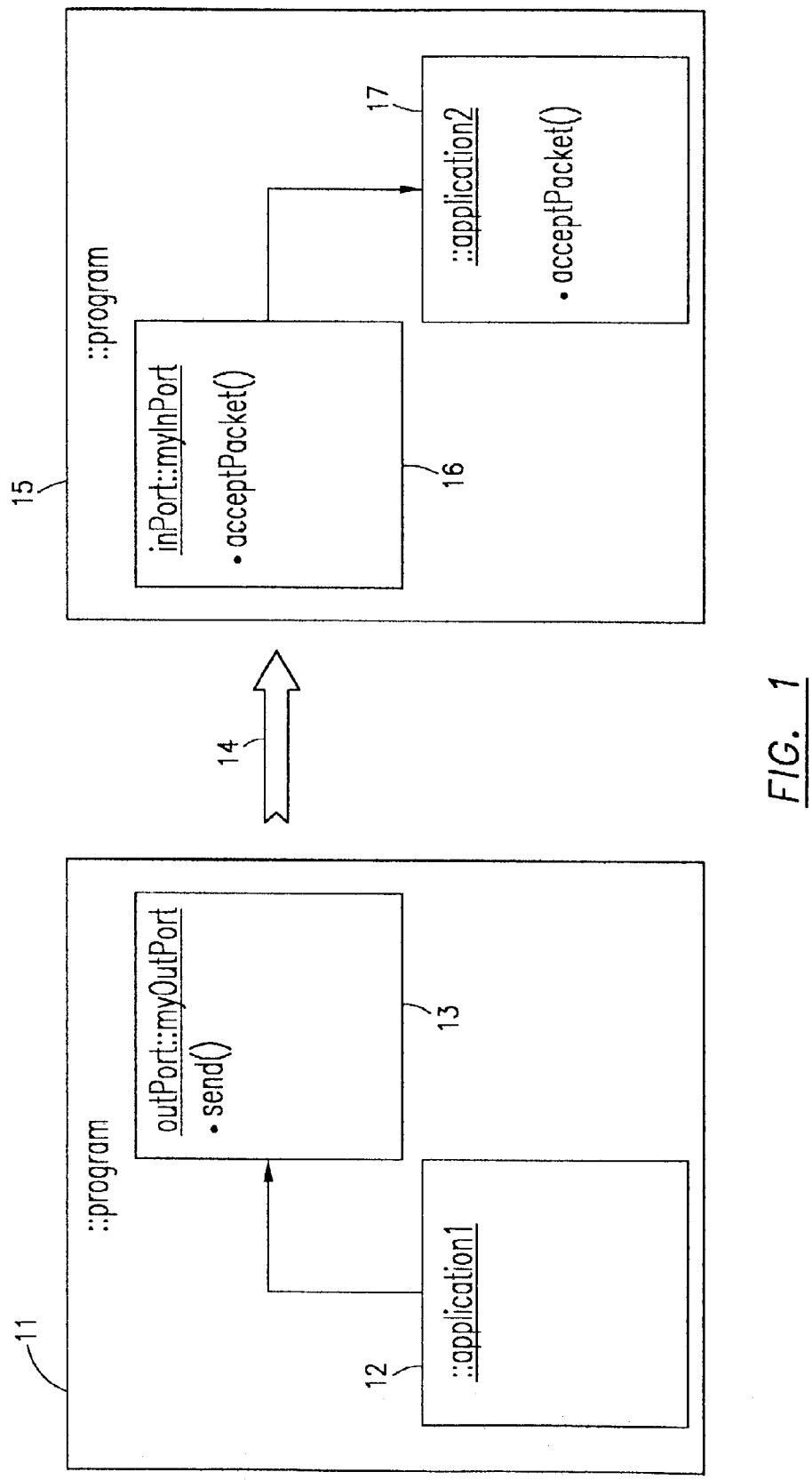
FIG. 1 is a schematic block diagram showing the required design of the programs including interface software objects myOutPort of class OutPort and MyInPort of class InPort for the system and method of sending and receiving streaming or high-volume data.

Referring to the drawings and especially FIG. 1, the system and method of sending and receiving streaming or high-volume data in accordance with the invention is shown. The invention described has been embodied in object-oriented software. The class and object names used herein are for description purposes only, and are not peculiar to the invention itself.

FIG. 1 shows the required design of the program. Each program 11 in the distributed architecture system that emits streaming data or large quantities of data in near real-time has at least one object of class outPort 13 shown as object MyOutPort. OutPort object 13 provides the interface from each application program 12 to the underlying communication system and method. To send data from the application program 12, the application program 12 invokes the send( ) method of the MyOutPort object 13 with an argument of a pointer (address) to the data packet to be sent. Note that the application program 12 does not have direct access to the list of destinations, nor access to whether there is in fact any destination, nor access to the communication system and method used. This simple interface to the application program 12 hides the details of implementation of the communication mechanisms. When the send( ) method returns, the application 12 may behave as if the data were sent. It is also possible for the underlying communication system and method to optionally defer actual physical communication until resources are available.

Element 14 represents in FIG. 1 the underlying communication method and system transferring data from program 11 to program 15.

Each program 15 in the distributed architecture system that receives and accepts streaming data or large quantities of data in real-time or near real-time has at least one object of class InPort 16 shown as object MyInPort. This InPort object 16 provides the interface from the underlying communication mechanism 14 to the application program 17. To receive data into the application program 17, upon receipt of data via the underlying communication mechanism 14, the InPort 16 method acceptPACKET 16 is invoked. The InPort 16 method acceptPACKET ( ) invokes the application 17 acceptPacket ( ) method with an argument of a pointer address to the data packet to be received. Note that the application program 17 does not have direct access to the source of the data nor access to in fact whether there is any data source, except when the acceptPacket( ) is invoked, nor access to the communication system or method employed. When the application program 17 acceptPacket( ) method returns, the InPort object 16 may behave as if data were received. The application 17 may optionally defer the actual processing, but a copy of data must be made.

By the use of this system and method of send( ) and acceptPacket( ), application programs 11 and 17, respectively, send and receive streaming data.

Figure 2A:
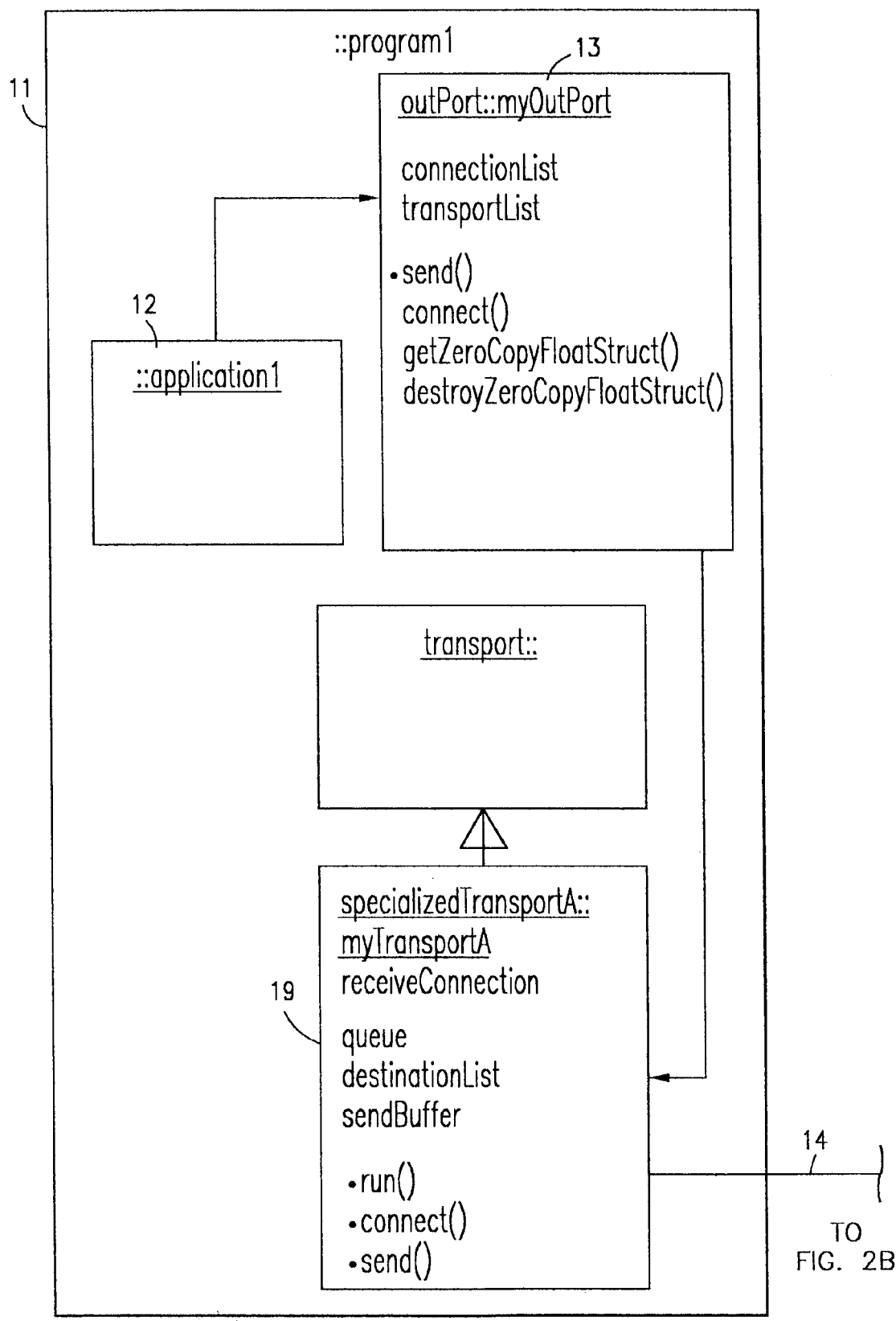
FIG. 2A shows a schematic block object diagram for the communication system and method for program 1.
Figure 2B:
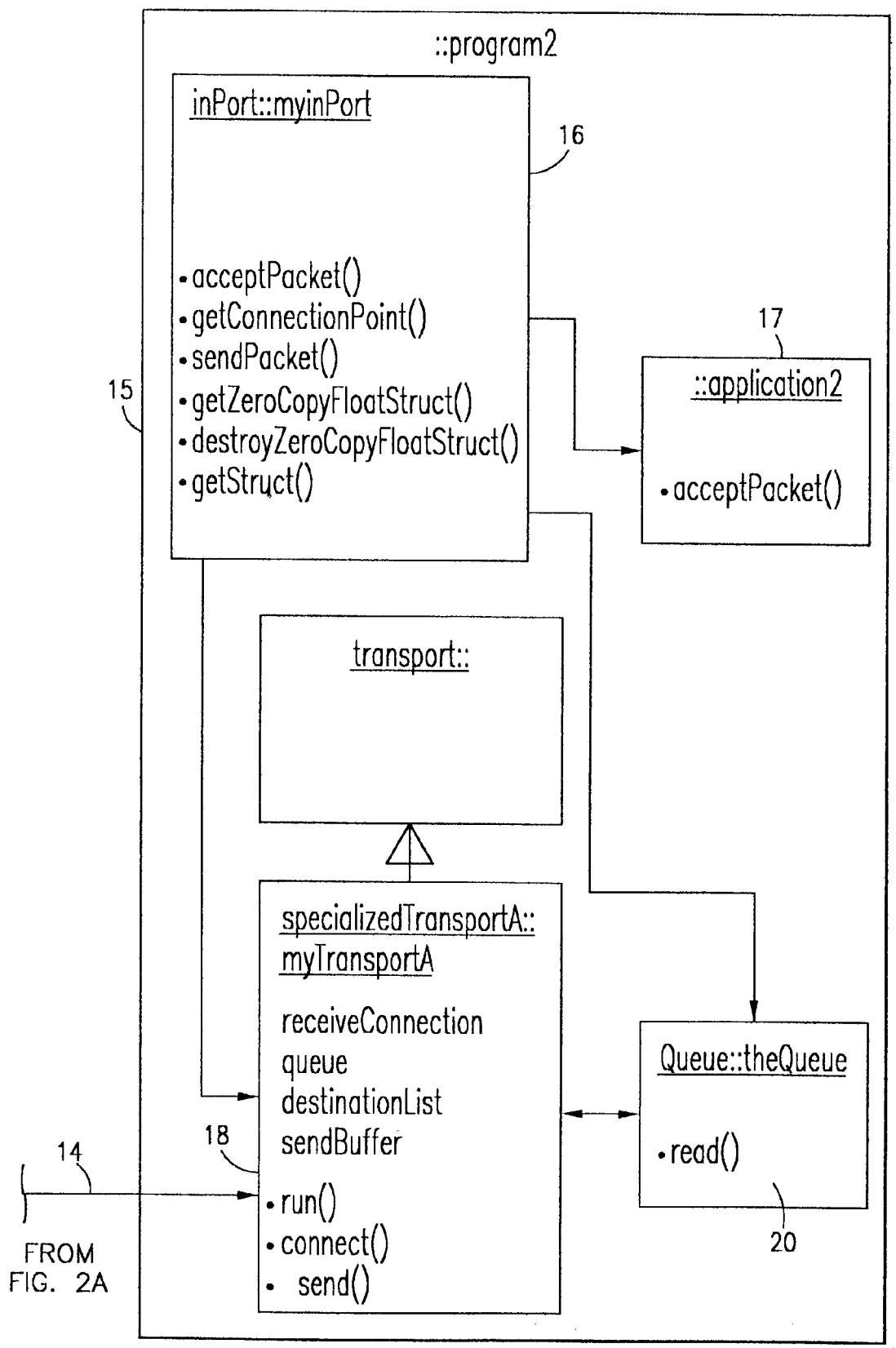
FIG. 2B shows a schematic block diagram for the communication system and method for the program 2.

Referring now to FIGS. 2A and 2B, the object diagram for communication used in the present invention is shown. FIG. 2A shows how the output data is achieved using the present invention and the flow of data within program 11. The communication framework establishes the connection from program 11 on FIG. 2A to program 15 on FIG. 2B. The communications framework establishes the connection by invoking the connect( ) method on the myOutport object of class OutPort 13 in program 11. The arguments of the connect( ) method contain the address of the myInPort object of class InPort 16 in FIG. 2B and the connection type (the communication system and method) to be used on connection 14 to pass the streaming or high-volume date from the Outport 13 through connection 14 to InPort 16. The form of the address of the InPort 13 is specific to the communication system and method used to configure and deploy the programs. The CORBA object reference of the myInPort is supplied for the first embodiment of the invention. The mechanism of invoking the connect( ) method is also specific to the communication system and method used to configure and deploy the programs. In the first embodiment of the invention, the method of invocation is by a CORBA call, a remote method invocation.

In FIG. 2A, the outPort object 13 adds the address of the inPort 16 (FIG. 2B) and the connection type to a list maintained for that outPort 13. The outPort 13 invokes a getConnectionPoint( ) handshake method on the inPort 16 and, depending on the connection communication type, receives the address of the inPort 16 to be used to pass the streaming and high-volume data from outPort 13 to inPort 16, and an endian flag. The method and system of invoking the getConnectionPoint( ) method in inPort object 16 is specific to the communication system and method used to configure and deploy the programs. The form of the address of the inPort object is specific to the communication mechanism used to pass streaming or high-volume data from outPort 13 to inPort 16. The endian flag will be used to determine if endian conversion is needed for this connection due to dissimilar processors.

The method getConnectionPoint( ) in inPort object 16 handshake method computes the endian flag and sets the communication mechanism used to pass the streaming or high-volume data by creating a new object of class transport extended or specialized 18 for the selected communication mechanism shown as object myTransport A of class specialized Transport A.

For each communication system and method used to pass the streaming or high-volume data, there exists a specialized class which is an extension of the base transport class. Therefore, all specialized transport classes inherit the same generalized transport class interface. The various specialized transport classes-for all the communication systems and methods possible in the particular system configuration are compiled as part of the system software program.

The new specialized transport object 18 for communication system or method different than the communication mechanism used to deploy and configure the program, creates a new server (reader) thread which executes the run( ) method of the specialized transport 18 which pends on the data being available. This ( ) run method blocks until data is available via the underlying communication mechanism.

After the return from the getConnection Point( ) handshake method on the inPort 16, the outPort object 13 sets the communication system and method used to pass the streaming or high-volume data by creating a new object of class transport 19 (FIG. 2A) extended or specialized for the selected communication system and method employed shown as object MyTransport A of class specialized Transport A.

This transport object 19 is added to a list of transport objects used kept inside the outPort 13. Next the connect( ) method of the transport is invoked, having the address of the inPort 13 and an endian conversion indicator as an argument. Again, the form of the address of the inPort 13 is specific to the communication system and method used to pass the streaming or high-volume data from the outPort 13 to the inPort 14.

Within the specialized transport object 19 the connect( ) method varies. For stateless (connectionless) communication protocols, the destination address is added to a list maintained within the transport object. For connection based communication protocols, a client (send) type connection is created using the native mechanism for that communication mechanism.

The following is a discussion which involves the streaming data or high-volume data transfer phase of the invention. Again, this is in reference to FIGS. 2A and 2B. As shown in FIG. 2A, the sending application program invokes the send( ) method on the outPort 13 with the argument of the pointer (address) of the data. The outPort send( ) iterates through the list of transport objects established during the connection phase. Each transport object send( ) method either creates a new sending buffer in transport 19 and copies the data from the application program to the new buffer, or uses the buffer populated by the application program. The sending buffer is of the size and format required by the communication system and method for that transport object. In general, these are different for each communication mechanism. For each destination maintained in the transport object, the data is formatted, packed into a previously agreed upon format, including any header information, and the size of the packet, and is sent. The exact mechanism for transfer both system and method is the function of the specific transport object specialized class. For connection based communication mechanisms, the connection identity is taken from the destination list in the transport object 19. For connectionless communication protocols, the destination address in the particular format for that communication mechanism is taken from the destination list in the transport object. For communication mechanisms that send immediately, the buffer is deleted after the send is successful for all destinations, for all transports. For communication mechanisms that post the send for later execution by another processor, such as a direct memory access (DMA) engine or by another thread in the same processor, the buffer is marked "in transit" and is deleted only when the send is successful for all destinations for all transports.

Referring now to FIG. 2B, the receiving application pends on data arrival that is, blocks execution until data arrives. The exact mechanism depends on the specific transport object 18 class. Upon arrival, the transport object 18 copies the data into a buffer, unpacks and unformats the data, corrects the endian if required, and invokes the sendpacket( ) method of the inPort 16. The sendpacket( ) method of the inPort 16 invokes the acceptPacket ( ) method of the inPort 16. The acceptPacket method of the inPort 16 invokes the acceptPacket method of the application program 17 to perform meaningful processing of the input data packet as described above. When the acceptPacket( ) method returns, the sendpacket( ) of the inPort 16 returns and the transport 18 deletes any buffers as required.

As currently embodied for the CORBA communication system and method, the ORB manages a pool of threads, and when a remote invocation of the inPort sendpacket( ) is received, and there is a thread available in the thread pool, the inPort sendpacket( ) method is invoked in a thread and the thread enabled to run. Reformatting consists of copying data from standard CORBA simple types to the native packet types.

As currently embodied, for the TCP/IP socket communications mechanism, each connection established above has a socket pending on data arriving to the port associated with the inPort. A blocking read( ) is performed as part of the run( ) method of the specialized transport. The operating system holds off the execution of the reading thread until data becomes available. Upon data being available, a header is read from the socket, which indicates how much data is to be read. When the data is read, the run( ) method of the specialized transport 18 unpacks the data, performs endian correction if required, and invokes the inPort sendpacket( ) method.

As currently embodied, for gm and shared memory communications mechanism, each connection established above has a queue 20 created. A blocking read( ) of the queue is performed as part of the run( ) method of the specialized transport. The operating system holds off the execution of the reading thread until data becomes available. Upon data in the queue 20 becoming available, the pointer in the queue is used to access the data packet, which was placed in memory by the actual communication mechanism used, such as DMA. When the data is read, the run( ) method of the specialized transport unpacks the header of the data, and may perform endian correction if required, and invokes the inPort sendpacket( ) method.

A separate program executes in each processor that uses these mechanisms, performing or managing the data movement, putting a pointer in the queue when a packet arrives from the communications hardware. For TCP/IP, this program is typically part of the operating system, for gm and shared memory, it is typically separately developed.

The invention described above can include alternate embodiments to increase performance and utility which include improvements in management of buffers. This is now described.

On the send side, the application program can request the creation of buffers in advance of sending data. This is provided by a getZeroCopyFloatStructure( ) method of the outPort as shown in FIG. 2A outPort 13. This method takes as an argument the desired size of the buffer, and an indication of whether the buffer is to be returned to the outPort after being sent. This enables an application program to manage a set of buffers for application-specific memory management, such as ring buffers or other container classes. The buffer created by this method meets the requirements of the underlying communication mechanism, such that copying of data into another buffer is avoided. A method for returning these buffers is provided by the outPort 13 destroyZeroCopyFloatStruct( ) method. The method takes as an argument the address of the buffer to be returned.

Referring now to FIG. 2B, on the receive side, the application program can provide buffers to the inPort 16 by overloading the getstruct( ) method. The application program can request the creation of buffers in advance of receiving data. This is provided by getZeroCopyFloatStruct( ) method of the inPort. This method takes as an argument the desired size of the buffer. This enables an application program to manage a set of buffers for application-specific memory management, such as ring buffers or other container classes. The buffer created by this method meets the requirements of the underlying communication mechanism, such that copying of data into another buffer is avoided. A method for returning these buffers is provided by the inPort destroyZeroCopyFloatStruct( ) method. The method takes as an argument the address of the buffer to be returned.

With respect to the embodiment disclosed, the communication system and method used to deploy and configure the distributed software application programs first used was CORBA. The communication system and method used to communicate streaming data or large-volume date were CORBA (remote procedure invocation), sockets (TCP/IP) implemented over Ethernet, and also over Myrinet physical communication mechanisms( ), gm (a native mode protocol for Myrinet communications fabric), shared memory (for VMEbus-based architectures). It is appreciated that other generally popular communication transports can be added using the system and methods described herein.

The present invention has been described herein by providing the underlying communication systems and methods that are selected at the time of communication between programs on the same or different processors, after the deployment of the programs to the processors. The systems and methods may be established well in advance of the transfer of information connection or immediately preceding the transfer. A software interface is provided that hides the underlying communication mechanism, and provides mechanisms to have the communication mechanism selected at connection time, independent of the communication mechanism used for the configuration and deployment. The application program itself has no accommodation for any specific selected communication system and method as such accommodations exist in the software interface.

The present invention solves the problem of changing the underlying mechanism at run-time for handling changes in processing and communication equipment used in a distributed processing system.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A distributed processor architecture computing system having one or more processors and an object oriented control program including a system for replacing underlying connection based communication mechanisms in realtime systems at runtime comprising:

a first program for emitting streaming data or a large quantity of data in near realtime having at least one object of class outport, said outport object providing interface from a first application program to an underlying communication mechanism;

said first application program for sending streaming data connected to said outport object;

said outport object including a connection list and a transport list and a send method;

said first application program providing an argument of an address in the memory space of the first application program of a data package to be sent to the outport object;

a second application program for receiving streaming data or large quantities of data in near realtime having at least one object of class InPort, said InPort object providing interface from the underlying communication mechanism to the second application program;

said second application program for receiving streaming data from said first application program;

said second application program extending a base class import object to perform meaningful processing in a method (ACCEPTPACKET) including said argument of address in the memory space of the second application program of the data packet to be received, whereby the interface to the second application program hides details of information to the communication mechanism, and whenever said, second application program ACCEPTPACKET method returns said InPort object behaves as if data were received;

said InPort object including a connection point handshake by creating a new object of class transport extending for the selected communication mechanism; and a communication connection between said first program and said second program for transferring streaming data from said first program to said second program through the selection of the underlying communication mechanism at runtime; and said communication mechanism for the transfer of streaming data which may be the same as or different than the communication mechanism used to establish said communication connection.

2. A system as in claim 1 that through the selection of underlying communication mechanisms at runtime permits accommodation of changes to communication resources availability due to link, equipment, software failures or communication bandwidth resources being used by other collaborating programs.

3. The system as in claim 1 wherein the interface to the first application program hides the implementation of the communication mechanism and the interface to the second application program hides the implementation of the communication mechanism.

4. The system as in claim 1, where a multiplicity of second application programs exist, each being different or the same and communication connections are established to all such second application programs; and the first application program transfers streaming data to all such connected second application programs.

5. The system as in claim 1, where the selection of communication mechanism may be different for each second application program.

6. The system as in claim 1, where the underlying communication mechanisms may be other than remote object transport mechanisms.

7. The system as in claim 1, where said outPort on said first application program provides a method to generate buffers for use by the first application, in advance of the first application sending data, where such buffers meet the requirements of the selected communication mechanism(s), such that copying of data from the provided address in the memory space of the first application program is not required, yielding an effective improvement in communication throughput between the first application and the second application.

8. The system as in claim 1, where said import on said second application program provides a method to generate buffers for use by the second application, in advance of the receipt of data, where such buffers meet the requirements of the selected communication mechanism(s), such that copying of data into the provided address in the memory space of the second application program is not required, yielding an effective improvement in communication throughput between the first application and the second application.

\* \* \* \* \*